Figure 1:
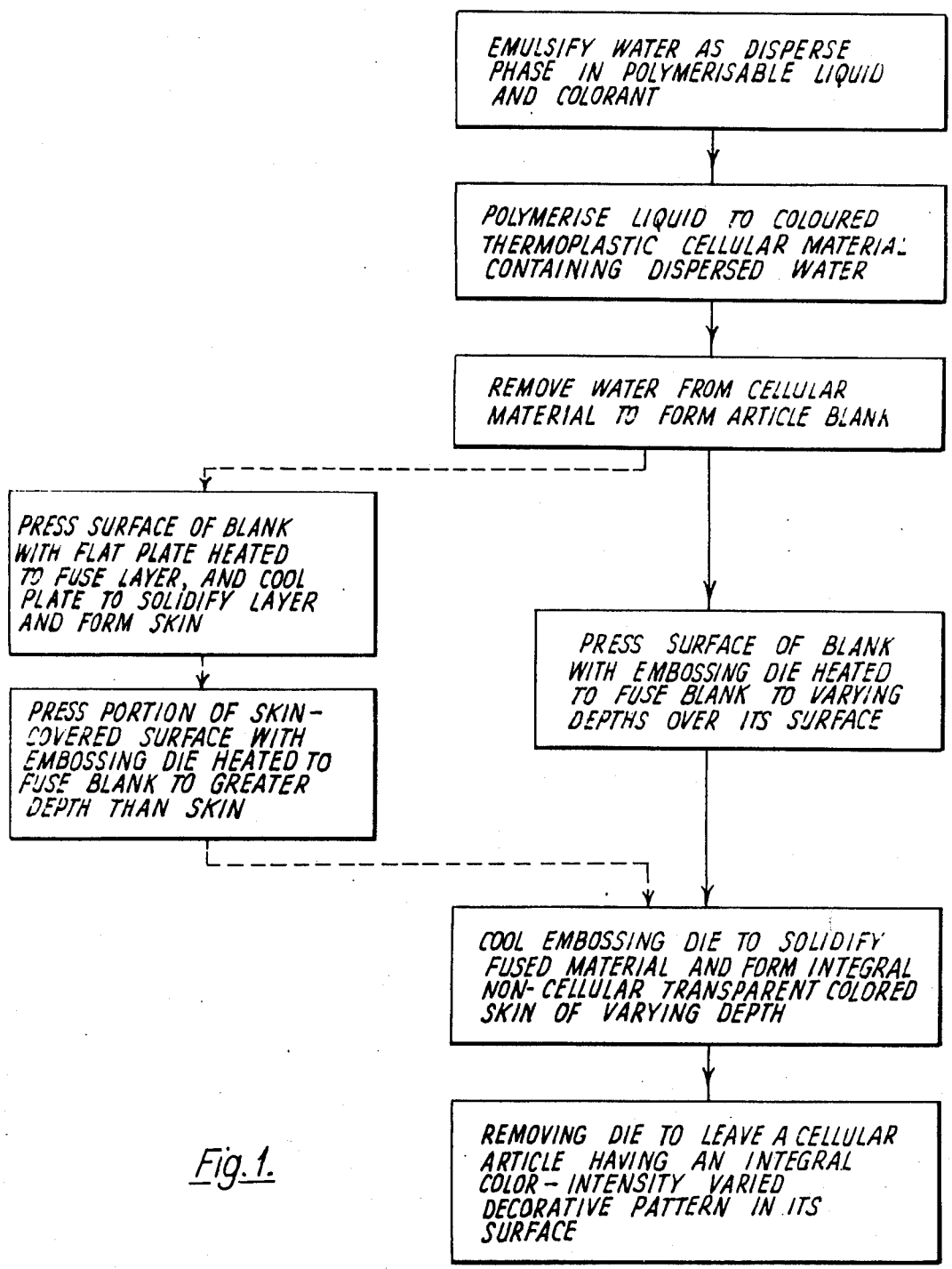

United States Patent [19]
Ryan et al.

[11] 3,981,949
[45] Sept. 21, 1976

[54] METHOD OF FORMING A CELLULAR ARTICLE HAVING AN INTEGRAL, COLOR-INTENSITY VARIED DECORATIVE PATTERN ON ITS SURFACE

[75] Inventors: James Ernest Ryan, Knebworth; Rodney Smale, Hatfield, both of England

[73] Assignee: Imperial Chemical Industries Limited, London, England

[22] Filed: July 2, 1973

[21] Appl. No.: 375,936

[30] Foreign Application Priority Data
July 11, 1972 United Kingdom............. 32346/72

[52] U.S. Cl............................. 264/41; 260/2.5 EP; 260/2.5 L; 260/29.6 WQ; 264/45.5; 264/48; 264/245; 264/321; 264/DIG. 14; 264/DIG. 17; 428/158; 428/315

[51] Int. Cl.²........................................ B29D 27/04

[58] Field of Search............. 264/48, 45.5, 41, 321, 264/245, DIG. 14, DIG. 17, 29.6 WQ; 260/2.5 BP, 2.5 EP, 2.5 L; 428/158, 315

[56] References Cited
UNITED STATES PATENTS
| | | | |
|---|---|---|---|
| 3,726,819 | 4/1973 | Dijkhuizen | 260/2.5 EP |
| 3,802,949 | 4/1974 | Brown | 264/48 X |

*Primary Examiner*—Philip Anderson
*Attorney, Agent, or Firm*—Cushman, Darby & Cushman

[57] ABSTRACT

An article, such as a door, is made from a colored water-extended thermoplastic polymeric material, and is provided with a decorated pattern by fusion of a surface layer to form a non-cellular layer, the depth of fusion being different in different parts so that the depth of color is correspondingly different. The variation in color intensity provides a decorative pattern, and fusion of the cellular material is effected by pressing with a die in the shape of the desired pattern.

5 Claims, 2 Drawing Figures

METHOD OF FORMING A CELLULAR ARTICLE HAVING AN INTEGRAL, COLOR-INTENSITY VARIED DECORATIVE PATTERN ON ITS SURFACE

The invention relates to the formation of decorative panels having embossed surfaces, and is an improvement or modification of the invention described in the Complete specification filed in pursuance of British patent application No. 45289/70, and published in the corresponding Dutch specification No. 71,13065.

The aforesaid specification describes the formation of an integral skin on the surface of a thermoplastic water-extended polymer by applying pressure through a heated plate so as to fuse the cellular material into a non-cellular skin. The formation of a textured surface by using a plate whose surface is correspondingly relieved, is also described. We now find that when using a water-extended polymer which is coloured, the depth of colour is increased where embossing has taken place.

According to the invention we now provide a method of forming a cellular article having a colour whose intensity is varied to provide a decorative pattern thereon, the method comprising polymerising the continuous phase of an emulsion having an aqueous disperse phase and a continuous phase comprising one or more polymerisable liquids to form a water-filled cellular thermoplastic material, the emulsion containing a colourant for imparting a colour to the polymeric material and being free from any substance other than the aqueous disperse phase which would render to polymeric material opaque, removing the water from the polymeric material, thereafter pressing at least a portion of a surface of the material with a die maintained at a temperature above the softening point of the polymeric material so as to fuse the layer underlying said surface to a depth being a depth less than the thickness of the cellular material, cooling the die to harden the fused polymeric material and subsequently withdrawing the die, wherein the die is shaped to correspond to the desired pattern so that said surface is embossed by a varying amount corresponding to the shape of the die whereby the intensity of the colour of said surface is varied according to the depth by which said surface is embossed.

The polymer being free from substances rendering it opaque, is transparent or translucent in its non-cellular form, but the cellular structure gives it opacity so that it appears whitish with very little colour. Fusion of the surface layer or a portion thereof, provides an integral non-cellular transparent or translucent surface layer of the same polymeric material whose thickness depends on the depth of material fused during embossing. Such a surface layer appears to have a colour according to the colourant used, and the intensity of the colour is dependent on the thickness of the non-cellular layer. Hence by making different parts of the layer have different thicknesses by embossing to a greater or lesser degree, the intensity of the colour appears to be correspondingly different in the different parts, thereby providing the decorative pattern.

Both dyes and pigments are generally suitable for use as the colourant, provided the latter do not render the polymeric material too opaque for a difference in colour intensity with difference in thickness of the non-cellular layer to be visible. However, apart from some white pigments and certain rather dense red and yellow pigments, we have found in practice that most pigments may be used. We include in the term "colourant" any other compound (subject to such restrictions as specified herein) which imparts colour to the polymeric material, and so certain stabilisers and accelerators which tend to impart a brown colour to the material are included within this term.

By "pattern" we include designs and motifs composed of single or repeated features. In its simplest form a single motif having a uniform intensity of colour which is more intense than the surrounding surface of the article, may be formed by pressing a flat-faced, heated die having a section shaped in the shape of the desired motif, into the article to fuse the material and so emboss the surface in the shape of the die section to constant depth. More complicated patterns may be provided using a die whose face is relieved so as to emboss the surface to different depths according to the pattern desired.

Because of its cellular structure, the walls between adjacent cells of a water-extended polymer are generally correspondingly thin. This gives rise to a surface texture which is readily scored, and where the pattern is formed on only a part of the total surface area, it is therefore preferred for most applications to strengthen the remainder of the exposed surfaces by forming an integral non-cellular skin. This may be accomplished by pressing all or part of the surface of the material with a plate at a temperature above the softening point of the polymeric material sufficiently to fuse a layer of material to a substantially constant depth, cooling the plate to harden the skin and subsequently withdrawing the plate; as described in the aforesaid specification. The plate and embossing die may be integral so as to glaze exposed surface areas while forming the decorative pattern, and this is particularly useful where a lightly coloured pattern is required surrounded by a darker, more intensely coloured area of skin. In such a case the combined die and plate may have a planar surface to produce the darker surround, with the pattern formed as a sunked portion of the die surface. Thus when the surface skin and pattern are formed in the polymeric material, the pattern stands proud of the surface, and since the material has been fused to a lower depth, the colour of the pattern appears lighter. Indeed for most applications we prefer to form the pattern and the skin (if any) simultaneously. The skin surface will generally conform to the surface of the plate so that a glossy, matt or textured surface may be provided by using a suitably surfaced plate, this surface texture may, however, be changed where the pattern is subsequently formed. A skin may be formed on all or only part of the exposed surfaces as desired.

The various operative steps of method of the present invention are illustrated diagrammatically in FIG. 1.

The invention may be used in forming decorative tiles for walls, furniture and the like, and similarly for large decorative panels. Shaped articles cast in a water-extended polymer, e.g. table lamp bases, vases and like containers, or stands for writing equipment, may all be conveniently decorated in this manner As a particular aspect of the invention, we find that decoration applied in the manner described herein, enables us to produce room doors, cabinet doors and the like by a simple casting process and to obtain a product having a pleasing appearance.

According to a further aspect of the invention, we therefore provide a method of making a door, including the steps of forming a door blank of coloured water-extended polymeric material, glazing the exposed surfaces of the blank and decorating at least one surface by embossing with a desired pattern, all three steps being accomplished as specified hereinabove. As described for shaped articles generally, the skin may be formed in advance of the formation of the pattern, but simultaneous operations are again generally preferred. Our preferred decorative patterns for the doors are simple rectangular panels of traditional form, but in contrast to wooden doors of the traditional type, the panels have a colour more intense than the surrounding door surfaces, an effect which we find particularly pleasing. Moreover by reason of the colour being incorporated in the polymeric material, redecoration by painting is no longer essential for appearance or protective reasons. Other decorative patterns may be formed as desired.

The polymeric material on which the patterns are formed may be homogeneous, but interesting effects can be achieved by using laminates formed, for example, by sequential casting techniques or by laminating two or more individually cast sheets. In sequential casting, an initial layer is cast, and when the initial layer has cured at least sufficiently to retain its identity, one or more subsequent layers of emulsion may be added and then cured in contact with the previous layer. Individually cast sheets may be laminated using adhesives, but where a thin surfacing superstrate is laminated on to a cellular substrate, the heat provided during skin formation or pattern formation may be sufficient to provide a strong bond without requiring adhesives. The various layers may have different colours, so that there may be colour differences in the embossed regions, or the polymeric material from which the outer layer is formed, may be a material which is particularly readily glazed so as to provide an improved surface finish on a core which is less readily glazed. To produce different colours, the material may be laminated so as to comprise at least one surface lamina overlying an underlying lamina having a different colour, the relieved die being caused to fuse at least one selected area of said surface lamina and also to fuse the lamina underlying said selected area to a depth less than the full depth of said underlying lamina. Although the colour of the underlying lamina will be intensified, it will be appreciated that its colour will be modified by any colour in the overlying lamina through which it will be viewed.

The reasons for selecting water-extended polymers for forming the decorated articles of the present invention, include the particularly good surface finishes which we find that we can obtain with these materials. We believe that this is due mainly to the very uniform and fine cellular structure obtained in such materials. Using particularly efficient emulsifiers, water-in-oil emulsions having cell diameters of about 1 $\mu$m may be produced, giving water-extended polymers with cell sizes of around 5 $\mu$m or less. Generally however, with reasonably efficient emulsifiers the majority of cells have diameters of up to about 10 $\mu$m, with possibly a minor amount up to about 50 $\mu$m; and hence the sizes of the cells so formed are very much lower than is found in foams produced by normal blowing methods. Furthermore, in order to squeeze out the air from the cellular material and form a homogeneous non-cellular layer, whether as a skin or as part of an embossed pattern, requires the application of pressure. Hence if the internal cellular structure is to remain cellular it must be sufficiently strong to withstand such pressures, and we find that water-extended polymers, especially those formed from emulsions having water contents of 50–90% by weight, have suitable strength, unlike blown foams we have tested. The pressure required for embossing water-extended polymers will depend on the polymer used, and the temperature of the embossing die. For example, when embossing a material consisting mainly of polymethyl methacrylate, pressures as low as 7 to 17 bar (approximately 100–250 psi) may be used with dies maintained at temperatures in the region of 175°C.

Another reason for selecting water-extended polymers is that the invention lends itself to short run production where only small numbers of a particular pattern or shape of decorative panel are produced, the design then being changed. Water-extended polymer may be cheaply and easily produced even in small quantities, since it can be produced without the necessity of either extrusion apparatus or efficient heat exchange means for preventing the monomer boiling due to the exotherm of the polymerization reaction. The preferred water-extended polymers and details of the conditions under which they are formed from inverted emulsions are described in the aforesaid specification, which description is therefore incorporated herein by this reference.

The invention is illustrated by the following Examples:

EXAMPLE 1

A door blank was cast from a water-in-oil emulsion in which the continuous oil phase of the emulsion consisted of 2% by weight of "Atlac" 382 E (a propoxylated bisphenol A fumarate polyester, marketed by Honeywell-Atlas Limited, and having an acid number of 12), 2% by weight of triethanolamine, 2% by weight of benzoyl peroxide (added as 4% of a 50% solution), 0.8% by weight of dimethyl-p-toluidine, and methyl methacrylate up to the total 100 weight %. Water was added with continuous stirring using an 8 cm diameter poppy-head dispersator to produce a stable emulsion containing 75% by weight of water as the disperse phase, the remainder being the above oil phase.

The initiated emulsion was then poured into a rectangular mould 198 cm × 76 cm to a depth of about 6.5 cm and left for about 45 min, after which time the methyl methacrylate had cured. The sheet was removed and dried in an oven for 2 days at 95°C and a further 15 days at 100°C. A log drying cycle had been found necessary because of the thickness of the sheets, but the cycle used could possibly have been reduced since this reduced the water content to about 0.04% by weight of water, but no difficulty was experienced in forming a skin or a decorative panel in sheets which had been left exposed for several weeks and which would then have been expected to have reached equilibrium at a higher water content. The cellular structure had a very even fine-celled appearance, the cell size being of the order of 2 to 5 $\mu$m.

After drying, the sheet was pressed between two flat plates at 160°C and 14 bar (200 psi) for about 10 s, the plates then being cooled and withdrawn. A skin was formed on both sides of the sheet, and the overall thickness of the sheet was reduced to about 4.5 cm. Six rectangular panels were formed in each surface of the sheet with their major axes parallel to the major axis of the sheet, the panels being evenly spaced about the surface, being arranged in three sets of pairs. The panels on each side were formed by pressing the sheet between two dies maintaied at 175°C. The dies were advanced into the sheet with a pressure of 17 bars (250 psi) for about 1 min to a predetermined position, and then cooled to harden the polymer.

Each die had six faces, each of which was flat over a rectangular area of 19 cm by 38 cm, enclosed within a raised edge strip 26 mm wide and inclined at a small angle to the plane of the flat area so that its inner and outer edges were raised above that plane by 4.8 mm and 9.6 mm respectively. The outer edge of the raised strip extended outwardly by a further 9.6 mm and downwardly to the plane of the flat area with a concave surface of radius 9.6 mm.

On withdrawl of the dies after cooling, six panels were left embossed into each surface of the sheet with the plane of the flat area about 5 mm below the glazed surface of the surrounding part of the sheet in each case. Thus the glazed sheet of about 4.5 cm thickness was reduced to about 3.5 cm thickness over the flat areas of the panels, reducing still further to about 1.6 cm at the edges of the panels. The concave edges of the die provided an imitationn convex bead.

The basic colour of the sheet was a pale buff, being discoloration due to the dimethyl-p-toluidine. The colour of the panels was intensified to a deep brown, the contrast being heightened by the further intensification of the colour in the more deeply embossed edges to the panel. A brass letter-box, door handle and knocker were attached with wood screws to give a door which appeard to use as most attractive, and suitable for a front door of a Georgian or Queen Anne style residence.

Figure 2:
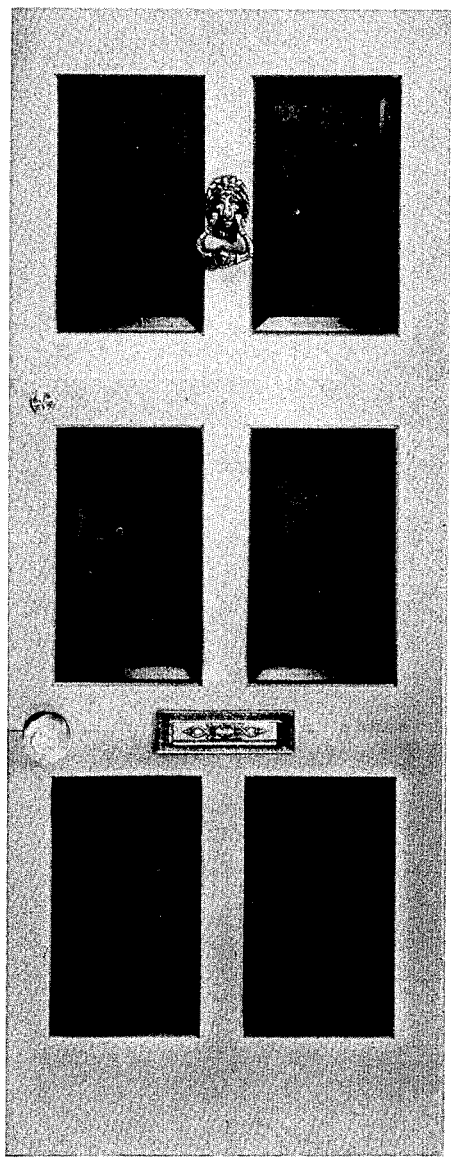

FIG. 2 is a photograph of the door made according to this example illustrating the deeper color (brown) of the six panels which is produced entirely by the embossing operation as described above.

EXAMPLE 2

A further 6.5 cm thick cellular sheet of water-extended polymethyl methacrylate was formed by curing a wate-in-oil emulsion at ambient temperatures. The continuous oil phase of the emulsion consisted of 2% by weight of ethyl cellulose, 10% by weight of 2-ethyl hexyl acrylate, 2% by weight of benzoyl peroxide, 1% by weight of dimethyl p-toluidine and 0.05% by weight of 'Waxoline Blue' (a monomer-soluble blue dye, 'Waxoline Blue' being the name under which the dye is sold by Imperial Chemical Industries Limited), the balance to 100 weight % being methyl methacrylate in which the other components were dissolved. The ethyl cellulose used was a commercially available grade, N10, marketed by Hercules Powder Company Limited, having an ethoxyl content specified as falling within the range 47.5 to 39.0% by weight, and having a viscosity within the range 8 to 11 cP for a 5 weight % solution in 80:20 toluene:ethanol of a sample dried 30 min at 100°C, the viscosity being measured at 25°C. 75 parts by weight of water, and 25 parts by weight of the solution in methyl methacrylate, were passed through an emulsifying machine wherein shear was applied to the mixture to form an emulsion in which water formed the disperse phase.

On leaving the emulsifying machine, the emulsion was immediately poured into a cell comprising two glass plates 1 m square, spaced apart by 6.5 cm. When filled, the cell was left for about 30 min to cure without het being supplied, the ambient temperature being about 20°C. After curing, the sheet was removed from the cell and dried in a hot air oven for an initial period of 2 days during which time the temperature was kept below 100°C as the bulk of the water was driven off. The temperature was then increased to 110°C for a further 10 days.

In contrast to Example 1, a separate glazing operation was omitted, because the whole of one side of the dried blank was embossed with a heated relieved die. The die had a planar surface in which were engraved two sets of mutually intersecting parallel channels wherein the angle of intersection was approximately 30°, and the channels were 1 cm wide and 0.5 cm deep. Thus the channels divided up the die face into an array of diamond shaped areas. Around the outer edge was a border, 5 cm wide, which was free from any engraved channels, the border being separated from the engraved area by a further channel following a rectangular path around the periphery of the engraved area.

The die was heated to a temperature of 160°C and was applied to the surface of the blank with a pressure of 17 bar (250 psi) for about 2 min. thereafter being cooled to harden the polymeric material, and subsequently withdrawn. The blue dye was found to have imparted a black colour to the material possibly due to interaction with the benzoyl peroxide. During the embossing operation, the overall thickness of the blank was reduced to about 5 cm, with ridges 1 cm wide and 0.5 cm high defining a repeating pattern of diamond shaped indentations with a surrounding plain border. The effect was to provide an embossed panel, the whole surface of which was covered with a non-cellular skin, the embossed pattern being clearly visible by the differential of colour in the different areas due to the different degrees of embossing. The diamonds and border areas were of a dark grey hue whilst the ridges defining the diamonds were a very pale grey, thus providing the visual contrast.

EXAMPLE 3

A second door was produced having dimensions and embossed panelling the same as that described for Example 1, but the colour was provided by introducing a monomer-soluble dye into the emulsion, and a recipe was used which was free from compounds which might interfere with the colour of the dye. The oil phase of the emulsion consisted of 2% by weight of ethyl cellulose (Hercules N10), 10% by weight of 2-methyl hexyl acrylate, 1.0% by weight of t-butyl perpivolate and 0.05% by weight of 'Waxoline Purple AS' (a monomer-soluble purple dye, 'Waxoline Purple AS' being the name under which this dye is sold by Imperial Chemical Industries Limited), the balance to 100 weight % being methyl methacrylate. The emulsion was formed from 75 parts by weight of water and 25 parts by weight of the solution in methyl methacrylate, using the emulsifying machine in the same manner as that of Example 2.

The emulsion was poured into the rectangular mould used in Example 1, which was then placed in an oven at 55°C for 4.5 hours to effect polymerisation. After polymerisation was completed, the sheet was removed from the cell and dried in a hot air oven initially at 95°C for 1 day, then at 115°C for a further 8 days. The dried sheet was then glazed in essentially the same manner as that of Example 1, except that a higher pressure of 34 bar (500 psi) from the heated plate maintained at 175°C was used, giving a result of similar appearance to that produced previously. In forming the decorative panels, however, it was not found necessary to intensify the conditions used in Example 1. Again the result was an attractive door in which the purple coloration was more intense in the four embossed panels.

EXAMPLE 4

The experiment of Example 3 was repeated using a pigment to provide the colour instead of the dye used in that Example. The pigment used was a blue pigment sold by Badische Anilin & Soda-Fabrik AG under the name and reference number "Euvinyl" 702; the pigment being copper phthalocyanine (40%) predispersed in a thermoplastic binder (60%). The quantity used was 0.1% by weight, the quantities of the other components being the same as those quoted in the previous Example.

The resulting door again showed an increase in the intensity of the colour in the embossed panels.

We claim:

1. A method of forming a cellular polymeric article having an integral, color-intensity varied decorative pattern in its surface, comprising forming a cellular polymeric blank by steps including emulsifying water as the disperse phase with a continuous phase comprising one or more polymerisable liquids and a colourant wherein the continuous phase is polymerisable to a transparent coloured thermoplastic material when polymerised separately from the aqueous phase, casting and polymerising the continuous phase while maintaining the aqueous phase dispersed therethrough to form a water-filled cellular thermoplastic material, and removing the water from the cellular material to obtain said blank, and pressing a surface of the blank with an embossing die heated sufficiently to fuse the cellular material and shaped so that the material becomes fused to varying depths over its surface, and thereafter cooling the embossing die so as to solidify the fused material and form a skin integral with the unfused cellular material, the various depth of fusion producing corresponding variations in the thickness of the transparent coloured skin thus formed, whereby the depth of colour varies according to the skin thickness and provides the integral, color-intensity varies decorative pattern.

2. A method as in claim 1 which comprises pressing the surface of the blank with a plate at a temperature above the softening point of the polymeric material sufficiently to fuse a layer of said blank to a substantially constant depth, cooling of the plate to harden the fused layer and form a non-cellular skin of substantially constant depth covering said surface, and subsequently withdrawing the plate; and thereafter pressing a portion of the skin-covered surface with an embossing die to fuse said portion to a greater depth than that fused by the plate, to thereby form the decorative pattern on cooling.

3. A method as in claim 1 for making a door, including the steps of forming a door blank of a water-extended polymeric material.

4. A method as in claim 1 comprising using a cellular blank comprising two or more laminae of cellular water-extended polymeric materials.

5. A method as in claim 4 in which the laminae comprise at least a surface lamina overlying an underlying lamina having a different colour, the relieved die being caused to fuse at least one selected area of said surface lamina and also to fuse the lamina uderlying that area to a depth less than the full depth of said underlying lamina.

* * * * *